3,489,737
CRYSTALLINE ISOTACTIC COPOLYMERS OF STYRENE DERIVATIVES PREPARED WITH IONIC COORDINATION CATALYSTS
Giulio Natta and Dario Sianesi, Milan, and Paolo Corradini, Naples, Italy, assignors to Montecatini Edison S.p.A., Milan, Italy
No Drawing. Continuation-in-part of application Ser. No. 62,508, Oct. 13, 1960. This application Sept. 27, 1965, Ser. No. 490,641
Int. Cl. C08f 19/04
U.S. Cl. 260—88.2                 21 Claims

ABSTRACT OF THE DISCLOSURE

Highly crystalline isotactic copolymers having an isomerphism of monomeric units being copolymer of styrene monomer and a nuclear substituted styrene monomer of the formula

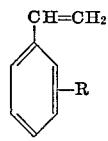

wherein R is selected from the group consisting of halogen and lower alkyl, and wherein the nuclear substituted styrene monomer yields a crystalline isotactic homopolymer the monomeric units of which behave as isomorphous units with those of styrene.

CROSS-REFERENCE TO RELATED APPLICATION

This application is a continuation-in-part of application Ser. No. 62,508, filed Oct. 13, 1960, now abandoned.

This invention relates to a new type of crystalline copolymer and to a process for preparing the same.

Heretofore, it has been known that if foreign monomeric units are introduced by copolymerization into the chain of a homopolymer, some irregularities of structure occur, which irregularities cause a decrease in crystallinity and in the melting point of the homopolymer. In the literature relating to macromolecular chemistry (e.g. Flory: "Principles of Polymer Chemistry," page 570, 1953 ed.), methods are described for calculating the decrease in molecular weight of the polymer from the number of irregularities introduced therein.

In the case of isotactic crystalline polymers, e.g., polypropylene and polybutene, the introduction into the chain of a different monomeric unit (e.g. of ethylene) causes a progressive decrease in crystallinity. For a sufficiently high ethylene content (>30%), this decrease can be observed by X-ray examination. Thus, a highly crystalline homopolymer having a high modulus of elasticity is transformed into an amorphous copolymer which has a low modulus of elasticity and presents elastomeric properties.

In an isotactic polymer the presence of relatively few irregularities of a steric nature is sufficient to destroy the crystallinity.

We have now surprisingly found contrary to what has heretofore been indicated, that the introduction of certain groups of monomers into certain homopolymers can be effected whereby it is possible to obtain crytalline isotactic copolymers having unusual and unexpected properties.

We have found that either o-fluoro-styrene or p-fluoro-styrene may be copolymerized with styrene to produce a crystalline isotactic copolymer, and this is so regardless of the particular molar proportions as between the styrene and o- or p-fluoro-styrene.

We have further found that styrene may be copolymerized with certain other nuclear substituted styrene to produce crystalline isotactic copolymers, provided that a certain range of molar proportions is observed. Thus, we have found that the mole percent of units derived from the nuclear substituted styrene in the resulting copolymer must not exceed a certain limit, as indicated in the following table.

TABLE 1

| Mole percent of units derived from nuclear substituted styrene in copolymer | Nature of styrene-nuclear substituted stryene copolymer |
|---|---|
| 0 to 70 mole percent p-methylstyrene | Crystalline. |
| 0 to 50 mole percent p-chlorostyrene | Do. |
| 0 to 40 mole percent p-bromostyrene | Do. |
| 0 to 40 mole percent p-ethylstyrene | Do. |
| 0 to 40 mole percent p-isopropylstyrene | Do. |
| 0 to 20 mole percent m-methylstyrene | Do. |
| 0 to 20 mole percent m-chlorostyrene | Do. |

Where the amount of molar units derived from any of the foregoing seven nuclear substituted styrene exceeds the limits specified above, we have found that the copolymer is completely amorphous.

Where either ortho-fluoro-styrene, para-fluoro-styrene or ortho-methyl-styrene is introduced by copolymerization into isotactic polystyrene (observing the ranges previously specified), the melting point and the crystallinity are not reduced, although a reduction would be expected based on the rules stated by Flory. (Such a decrease in melting point does occur if styrene is copolymerized with ethylene or propylene.) In the case of styrene-o-fluoro-styrene, styrene-p-fluoro styrene and styrene-o-methyl styrene copolymers, the presence in the isotactic polystyrene chain of monomeric units other than and different from styrene actually increases the melting point, in contrast to the decrease that ordinarily occurs.

In the field of the low molecular weight substances a similar phenomenon is observed in isomorphism, e.g. in the co-crystallization of compounds of an ionic nature, in which the ions have approximately the same size and also the same valence. Isomorphism phenomena may also take place with molecules of non-ionic compounds such as benzene and thiophene, which molecules have a different chemical constitution but present analogies in molecular size, in their aromatic nature, and in the absence of particular reciprocal interaction, due to Van der Waals forces, which favor particular types of association.

In the case of macromolecular substances, phenomena of this type generally do not occur. For instance, if separate macromolecules of isotactic polystyrene and of either poly-p-methylstyrene or polyfluorostyrenes are mixed, melted, and crystallized, there is no evidence of the formation of solid solutions with one another. Therefore, they do not behave as isomorphous molecules, at least under such conditions.

An isomorphism between macromolecules which more closely approaches the classic scheme (since it permits the formation of solid solutions between macromolecules) is observed by crystallizing a homopolymer, e.g., of a monomer A, with a copolymer of isomorphous monomeric units (A and B) having a high proportion of A, or conversely, or by co-crystallizing copolymers of isomorphous monomeric units A, B, A and B having compositions not very different from one another. In this case, solid solutions can be separated by physical means.

This scission obviously could not be obtained if the solid solution were to be originated by the presence of different isomorphous monomeric units in the same macromolecule of a copolymer.

We first observed the formation of copolymers presenting a high crystallinity and a melting point intermediate between those of the homopolymer by operating with aromatic monomers which give isotactic polymers. This can be considered as a particular case of isomorphism between monomeric units. It differs from the isomorphism between ionic compounds or between neutral molecules (which form true solid solutions) due to the fact that it occurs between parts of molecules (monomeric units) bound to each other by stable covalent links, which bonds cannot be separated by physical means (e.g., by dissolution or melting).

It is therefore an object of the present invention to obtain a new type of copolymer, this copolymer having an isotactic and highly crystalline structure, and being made from two or more vinyl monomers of the type

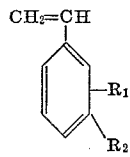

in which $R_1$ and $R_2$ are the same or different and can be hydrogen, halogen, or alkyl, and wherein at least one of the monomers yields a crystalline isotactic homopolymer the monomeric units of which are "isomorphous."

The monomers suitable for producing copolymers of this new type are styrene, p-fluorostyrene, p-chlorostyrene, p-methylstyrene, o-fluorostyrene, p-bromostyrene, o-methylstyrene and the corresponding m-substituted derivatives, p-ethyl styrene, o-isopropylstyrene, isomeric dimethylstyrenes, etc.

Copolymers of this type also can be obtained from mixtures of more than 2 monomers, comprising for instance, in addition to styrene, mixture of isomers of mono- and di-substituted styrenes, such as e.g. methyl- and halostyrenes.

A further object of the present invention is a process for preparing the copolymers in question by using coordination catalysts obtained from transition metal halides and organo-metallic compounds. Among the preferred catalysts we mention those obtained from $TiCl_3$, $TiCl_4$, $VCl_3$, $VCl_4$, and from Al, Be, or Zn alkyls.

In order that the phenomenon of the isomorphism between monomeric units take place, it is necessary not only that such monomeric units are able to polymerize or copolymerize with the same mechanism, but also that each is of a size not so different from the other, so that they can copolymerize while maintaining the same identity period as that observed for the chain of at least one of the corresponding homopolymers and can be packed with a low deformation of the lattice size in the direction normal to the chain axis.

We have found, however, that it is not necessary that the two homopolymers corresponding to the monomers present the same identity period and, in the case of isotactic polymers, the same symmetry of the main chain spiral, nor that the two homopolymers present the same crystal symmetry. In case of styrene and p-fluorostyrene, for example, the two isotactic homopolymers crystallize in different crystalline systems, for the polystyrene spiral has a ternary symmetry with an identity period of about 6.65 A. corresponding to 3 monomeric units whereas poly-p-fluorostyrene presents a higher identity period (8.1 A.), corresponding to 4 monomeric units.

In this case a phenomenon is observed which presents analogies with isomorphism and is known to occur with compounds of an ionic nature, so-called "isodimorphous" compounds. Thus, the formation of solid solution, e.g., of A in B and of B in A, when A and B in the pure state are not polymorphous, is considered to be caused by isodimorphism.

The solid solutions obtained with isodimorphous compounds present in general the structure which is most stable for the compound present in a higher proportion. In the case of copolymers of monomeric units which can be called isodimorphous, the resulting crystalline structure is in general that which is stable for the homopolymer of the monomer which is present in a higher proportion.

When only one of the two monomers (e.g., A) is capable of yielding a crystalline polymeric phase that is stable under the test conditions, only one crystalline copolymeric phase is observed and this is for those compositions corresponding in general to the predominant presence of monomeric units of the type A, while copolymers high in B, do not crystallize or crystallize with more difficulty.

This occurs in case of styrene-p-methylstyrene copolymers. We have found in general that different monomers give isomorphous monomeric units and crystalline copolymers when:

(1) they polymerize with the same coordered catalytic mechanism with formation, at least for one of them, of a stable crystalline homopolymer.

(2) In case the monomeric units can follow each other along the chain with different steric configurations, homopolymers obtained from single monomers with the same catalytic system present the same type of steric configuration (e.g., both isotactic or both syndiotactic).

(3) The two monomeric units of the type $CH_2{=}CHAr$ and $CH_2{=}CHAr'$ (where Ar and Ar' are aromatic radicals and may or may not be substituted) differ only in the size of the radical groups bound to the vinyl group. These radicals must not be very different from each other and must be of such a type as to permit the substitution of Ar of the crystalline homopolymer with Ar', causing only a light deformation (in most cases lower than about 10%) in directions perpendicular to the chain axis, assuming that the chains are packed in accordance with Van der Waals' distances.

Crystalline copolymers between isomorphous or isodimorphous monomeric units can offer very interesting characteristics.

Copolymers having a melting point higher than that of one of the two corresponding homopolymers can thus be prepared. This is the case with styrene-o-fluorostyrene, styrene-p-fluorostyrene, and styrene-o-methyl styrene copolymers, each of which has a melting point higher than that of isotactic polystyrene. The melting point can be varied as desired within the temperature range comprised between the melting points of the two homopolymers, depending on the composition. In contrast, with styrene-p-methylstyrene copolymers the melting point (230–240° C. for pure polystyrene) can be lowered to about 200° C. without excessively reducing the crystallinity.

The foregoing is further illustrated in Tables 2 and 3, hereinafter, wherein the melting points of styrene-p-fluorostyrene and styrene-p-methylstyrene copolymers are reported as a function of composition.

TABLE 2

Copolymer, styrene-p-fluorostyrene, p-fluorostyrene in the copolymer.

| Percent by weight: | Melting point, °C. |
|---|---|
| 0 | 234–5 |
| 7 | 235–6 |
| 16.5 | 237 |
| 23.4 | 238–9 |
| 35 | 240–2 |
| 44.4 | 246 |
| 53.7 | 248 |
| 64.5 | 251 |
| 73.5 | 253 |
| 85.2 | 255 |
| 100 | 263 |

TABLE 3

Copolymer, styrene-p-methylstyrene, p-methylstyrene in the copolymer.

| Percent by weight | Melting point, °C |
|---|---|
| 0 | 235 |
| 11 | 223 |
| 25 | 222 |
| 38.8 | 221 |
| 45.4 | 213 |
| 54.5 | 210 |

Another interesting effect is observed when one of the two homopolymers crystallizes very slowly and the other one more rapidly. In such cases, if the homopolymer with a slower crystallization also has a lower melting point, the melting point increase due to the copolymerization enables the crystallization to take place at a higher temperature, i.e., under such conditions wherein the chain flexibility is higher (because the steric hindrances for the C—C bonds rotation in the main chain are decreased), so that the crystallization rate increases as compared to that of the homopolymer.

In other cases the presence of different monomeric units can act as a lubricating agent and can favor the arrangement of the chain in a crystalline lattice, thus increasing the crystallization rate.

The preparation of isotactic copolymers with a given composition (of isomorphous monomeric units) can be carried out easily according to known copolymerization methods if the ratio between the concentration of the two monomers in the liquid phase containing the catalyst in suspension is kept constant. This constant composition is easily realized if the relative reactivity of both monomers are known and the polymerization apparatus is fed continuously.

Since the lattice constants of the copolymers vary depending on their compositions, X-ray diffraction spectra of the copolymers can present sharp reflections only when the compositions of all the copolymer macromolecules are the same.

When the monomers having the same or hardly different polymerization rates are copolymerized, rather homogeneous copolymers also can be obtained even if the copolymerization is not continuous. However, when the differences in reactivities of the single monomers are not very high, a variation in the composition of the copolymers is obtained in discontinuous copolymerization, unless the polymerization is limited to a low proportion of the monomers (e.g., for a brief time) so as to have a low variation of the ratio between the concentration of the two monomers. In other cases, a copolymer mixture is obtained, the composition of which varies with time. In these cases, products are obtained that are initially higher in monomeric units corresponding to the more reactive monomer and are then progressively increased in quantity of the other monomer. Since said chains are isomorphous they can co-crystallize, but the crystals appear to have a variable composition depending on the monomers conversion to polymers. Variations in the lattice constant correspond to these variations in the composition.

The copolymers therefore present rather enlarged X-ray diffractions. A similar phenomenon occurs for solid solutions of low molecular weight substances. However, while in this last case the first solid solutions formed can interact with the solution and after some time, be transformed into a homogeneous product, this does not occur with copolymers of isomorphous monomeric units, for these monomeric units are bound in the copolymer by chemical linkages.

In the case of copolymers it is possible to obtain more homogeneous products which give less enlarged X-ray diffractions if the polymerization is carried out in such a manner that the composition of the monomer mixture (or at least the ratio between the monomer concentrations) remains constant during the copolymerization. This can be achieved more easily if the copolymerization is carried out continuously.

The stereo-ordered copolymers of styrene with styrenes that are substituted in the nucleus with groups of small size can be shaped by the normal working methods used for thermoplastics (e.g. die casting, extrusion, injection molding) and will produce sheets, films, filaments and other articles which, due to their excellent properties, can be used in various fields such as e.g., electric insulating products and other applications wherein a high melting point is required.

The following examples will further illustrate our invention. All parts are by weight unless otherwise stated.

EXAMPLE 1

35 g. styrene and 17 g. p-methyl styrene are introduced under nitrogen into a 250-cc. glass flask provided with a stirrer and a dropping funnel, this flask being immersed in a thermostatic bath at 70° C. 0.23 g. of Al(iso $C_4H_9$)$_3$ dissolved in 20 cc. benzene are added with agitation. Subsequently, 0.20 g. finely ground $TiCl_3$ (violet crystalline modification) suspended in 20 cc. benzene are added while agitating. The agitation of the reacting system is stopped after about 20 minutes, i.e., when the system has reached a viscosity sufficient to prevent sedimentation of the catalyst. The reaction is then continued at 70° C. for 15 hours. At the end of this period the reaction mass is treated with an excess of methanol in order to decompose the catalytic reactants and to coagulate the copolymer formed. The copolymer is minced and purified by digestion with methanol containing hydrochloric acid. It is then separated from the alcohol containing the residual monomers by filtration, is washed with acetone, and is vacuum dried at 100° C. until its weight is constant. 31 g. of product are obtained, which product does not contain low-molecular weight fractions soluble in acetone.

The polymer has an intrinsic viscosity determined in tetrahydronaphthalene at 100° C. of 4.5 (100 cc./g.) and contains 34% by weight p-methylstyrene. The copolymer fractions separable by prolonged boiling with methyl ethyl ketone or benzene appear to have practically the same composition. The total reaction product and also the various fractions separable by extraction with various solvents after a brief annealing at 160–180° C., present a good degree of crystallinity by X-ray examination.

From the X-ray diffraction bands it appears that the copolymer crystallizes in a hexagonal symmetric lattice characteristic of crystalline polystyrene, with the cell size along axis $c$ remaining unvaried (6.65 A.), but with a deformation of axes $a$ and $b$ (from 21.90 to 23.0 A.). The infrared absorption spectrum, determined on a copolymer film, even after prolonged thermal annealing treatments shows the absence of bands at 12.74, 11.10, 10.84, 9.50, 9.24; 8.42, 7.92 and 7.60$\mu$, due to the statistic distribution of the different monomeric units along the spiralized chains. The temperature at which there is complete disappearance of crystallization, determined under a polarizing microscope, is about 220–225° C.

EXAMPLE 2

Under the same conditions as those of the preceding example, 35 g. styrene are copolymerized with 17 g. of a mixture consisting of ⅔ p-methyl styrene and ⅓ o-methyl styrene. 29 g. of a copolymer are obtained, which copolymer contains 81% styrene by weight, appears to be crystalline by X-ray examination, and has a melting point of 236° C.

EXAMPLE 3

Under the same reaction conditions as those of the preceding example, a mixture consisting of 25 g. styrene and 28 g. p-methyl-styrene is copolymerized. 32 g. of a copolymer containing 54% by weight p-methylstyrene are obtained. The copolymer presents an intrinsic viscosity [η] of 4.6 (100 cc./g.) and appears to be crystallizable after a brief annealing treatment.

The melting point of the crystalline portions is about 210° C. X-ray diffraction spectra shows that in the crystalline polystyrene lattice the axis of the cell in the direction normal to the axis of the macromolecules presents a deformation from 21.9 to 23.54 A. In the infrared absorption spectra crystallinity bands are absent.

EXAMPLE 4

0.28 g. TiCl₄ dissolved in 20 cc. benzene are introduced into an apparatus similar to that described in Example 1, and a solution of 0.50 g. Al(C₂H₅)₃ in 20 cc. benzene is then added dropwise while vigorously agitating. After this operation, which is carried out at 70° C., a mixture consisting of 7.0 g. styrene and 8.2 g. o-fluorostyrene is introduced into the reaction flask. The reacting system is rapidly cooled to 40° C. and at this temperature the polymerization is continued for 20 hours. After this period the copolymer formed is coagulated by addition of a methanol excess. The copolymer is then washed by digestion with methanol and hydrochloric acid and finally dried until its weight is constant. 3.65 g. of product are obtained. This product is insoluble in acetone and methyl ethyl ketone and presents an intrinsic viscosity, determined in tetrahydronaphthalene at 100° C. of 2.65. The product contains 18.7% by weight of o-fluorostyrene. The product, when subjected to annealing at 180° C. for 1 hour, presents a high crystallinity by X-ray examination. The structure of the crystalline lattice and the size of the elementary cell are practically coincident with those of crystalline polystyrene. The melting point is about 265° C. In the infrared absorption spectrum, obtained on a film made of the copolymer, almost complete absence of the crystallinity is noted, even after prolonged annealing treatment. This lack of crystallinity is due to the presence of o-fluoro styrene and styrene units statistically distributed in the single chains.

EXAMPLE 5

A mixture containing 4.5 g. styrene and 5.3 g. parafluorostyrene is polymerized under the reaction conditions of the preceding example. After 16 hours reaction at 40° C., 3.1 g. product, the residue from extraction with boiling acetone, are isolated by the methods already described. The polymer contains 55.6% by weight of styrene and presents a high crystallinity by X-ray examination. The X-ray diffraction spectrum shows that the product crystallizes in the lattice with hexagonal symmetry, characteristics of crystalline polystyrene, maintaining practically unvaried the size of the crystalline cell in the direction of the axis of the macromolecules but with a deformation in the directions of axis $a$ and $b$ of 0.86 A. The melting point is 245° C.

EXAMPLE 6

As in the preceding example, a mixture consisting of 12 g. styrene and 3.5 g. p-fluorostyrene is subjected to stereospecific polymerization. The crystalline polymer obtained (4.7 g.) contains 17% by weight of p-fluorostyrene. It presents a melting point of 236–237° C., whereas a crystalline polystyrene prepared under the same conditions has a melting point of 233–235° C. The crystalline lattice of the product obtained by polymerization of the styrene-p-fluorostyrene mixture corresponds to that of crystalline polystyrene with a deformation of 0.36 A. in the direction normal to the chain axis.

EXAMPLE 7

0.37 g. TiCl₄ dissolved in 20 cc. benzene, 1.10 g. of Al(iso C₄H₉)₃ dissolved in 20 cc. benzene, and 100 g. of a mixture of monomers consisting of 90 mole percent styrene and 10 mole percent para-chlorostyrene are successively introduced into the apparatus described in Example 1, under a nitrogen atmosphere at a temperature of 40° C. Polymerization is continued for 2 hours and thereafter 12.3 g. copolymer having a content of 8.8% by weight of p-chlorostyrene are isolated by introducing a methanol excess. The product has an intrinsic viscosity of 3.8 (100 cc./g.) determined in tetrahydronaphthalene at 100° C. and does not contain low molecular weight fractions extractable with boiling acetone. After annealing at 180° C. for 1 hour the copolymer presents a good crystallinity as determined by X-ray examination. Examination of the diffraction bands reveals that the product crystallizes with the characteristic lattice of crystalline polystyrene, with a deformation of the axis and of the elementary cell, normal to the direction of the macromolecule chains, of 0.3 A. The temperature at which the crystallinity disappears completely is 246° C.

EXAMPLE 8

Under the same operative conditions as described in Example 7, 100 g. of an equimolar mixture of styrene and o-methyl-styrene mixture are reacted. After 2 hours at 40° C., 7.5 g. of copolymer product is isolated as previously described, this product containing 13.3% by weight of o-methyl-styrene and being a residue from extraction with boiling methyl ethyl ketones and having an intrinsic viscosity of 3.5 (100 cc./g.) determined in tetrahydronaphthalene at 100° C. After a brief thermal treatment at 180° C. the product shows a high crystallinity by X-ray examination. The size of the elementary cell of isotactic polystyrene present a variation of 0.29 A. in the directions normal to the macromolecule axis. The point at which complete melting occurs is 247–248° C.

Variations can, of course, be made without departing from the spirit of our invention.

Having thus described our invention, what we desire to secure and claim by Letters Patent is:

1. A highly crystalline isotactic copolymer having an isomorphism of monomeric units and being a copolymer of styrene monomer and a nuclear substituted styrene monomer of the formula

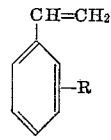

wherein R is selected from the group consisting of halogen and lower alkyl, and where said nuclear substituted styrene monomer yields a crystalline isotactic homopolymer the monomeric units of which behave as isomorphous units with those of styrene.

2. The copolymer of claim 1 wherein each monomer forming said copolymer is capable of homopolymerizing to form a crystalline homopolymer having the same symmetry of the main chain and of the lattice and the same identity period along the chain axis as that of the other, the crystalline lattice of the one homopolymer being different from that of the other homopolymer only for a low percent variation of about 10% of the lattice constants normal to the chain axis.

3. The copolymer of claim 2 having lattice constants and a melting point intermediate between those of the corresponding homopolymers.

4. The copolymer of claim 1 wherein the monomeric units of the monomers forming said copolymer behave as isodimorphous, and wherein the homopolymers of said monomers each present the same type of steric regularity but different stable forms of the chain so that a copolymer richer in one of the monomers presents the type of crystalline packing corresponding to the stable form of the corresponding homopolymer.

5. The copolymer of claim 1 wherein only one of the monomers from which this copolymer is made is capable of giving a homopolymer presenting a stable crystalline form and which appears crystalline, said copolymer having the same type of structure as said crystalline homopolymer when containing more than 50% of monomeric units deriving from said monomer which is capable of forming said crystalline homopolymer.

6. The crystalline isotactic copolymer of claim 1 wherein said copolymer contains a preponderance of monomer units of styrene, this copolymer having a melting point higher than that of polystyrene, said copolymer obtained by copolymerizing styrene with said nuclear substituted styrene monomer, whose homopolymer melts at a temperature higher than that of polystyrene and whose monomeric units behave as isomorphous with those of said styrene.

7. The copolymer of claim 6 wherein the monomeric units consist of styrene and p-fluorostyrene.

8. The copolymer of claim 6 wherein the monomeric units consist of styrene and o-chloro-styrene.

9. The copolymer of claim 6 wherein the monomeric units consist of styrene and o-methylstyrene.

10. The copolymer of claim 6 wherein the monomeric units consist of styrene and o-fluorostyrene.

11. The crystalline isotactic copolymer of claim 1 wherein said copolymer contains a preponderance of styrene, said copolymer having a melting point lower than that of polystyrene, said copolymer obtained by copolymerizing said styrene with said nuclear substituted styrene monomer, whose monomeric units behave as isomorphous with those of said styrene and whose homopolymer has a melting point lower than that of polystyrene.

12. The copolymer of claim 11 wherein the monomeric units consist of styrene and p-methylstyrene.

13. The copolymer of claim 11 wherein the monomeric units consist of styrene and m-methylstyrene.

14. The copolymer of claim 1 wherein the monomeric units consist of styrene and of at least 2 isomers of a styrene substituted in the aromatic nucleus.

15. The copolymer of claim 14 wherein at least one of the styrene isomers is an alkyl-substituted styrene.

16. The copolymer of claim 14 wherein at least one of the styrene isomers is a halogen-substituted styrene.

17. The copolymer of claim 14 wherein the monomeric units consist of styrene, p-methylstyrene and o-methylstyrene.

18. A process for preparing a highly crystalline isotactic copolymer having an isomorphism of monomeric units, said process comprising copolymerizing styrene monomer and a nuclear substituted styrene monomer of the formula

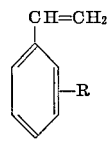

where R is selected from the group consisting of halogen and lower alkyl, said nuclear substituted styrene monomer capable of yielding a crystalline isotactic homopolymer the monomeric units of which behave as isomorphous units with those of styrene, in the presence of a coordination catalyst, said catalyst having been obtained by combining a transition metal compound selected from the group consisting of titanium chlorides and vanadium chlorides, with a metal alkyl wherein the metal is selected from the group consisting of aluminum and zinc.

19. The process of claim 18 wherein the transition metal compound is a titanium chloride.

20. The process of claim 18 wherein the transition metal compound is a mixture of $TiCl_4$ and $VCl_4$.

21. The process of claim 18 wherein the organometallic compound is trialykyl aluminum.

References Cited

UNITED STATES PATENTS

| | | | |
|---|---|---|---|
| 2,882,263 | 4/1959 | Natta | 260—93.7 |
| 2,936,302 | 5/1960 | Jones | 260—93.7 |
| 3,014,897 | 12/1961 | Hodes | 260—80.5 |
| 2,834,764 | 5/1958 | Thomas | 260—85.5 |

OTHER REFERENCES

Sianesi, O.; Pajaro, G. & Danusso, F. Chimica E L'Industria, La (Milan) vol. 41, pp. 1176–80 (1959).

Natta, G.; Isomorphism Phenomeno in Macromolecules, Journal of Polymer Science, vol. 51, pp. 527–39, 1961.

JOSEPH L. SCHOFER, Primary Examiner
R. S. BENJAMIN, Assistant Examiner

U.S. Cl. X.R.

260—80.78

UNITED STATES PATENT OFFICE
CERTIFICATE OF CORRECTION

Patent No. 3,489,737                                                   January 13, 1970

Giulio Natta et al.

It is certified that error appears in the above identified patent and that said Letters Patent are hereby corrected as shown below:

Column 1, line 18, "merphism" should read -- morphism --. Column 3, lines 16 to 22, the formula should appear as shown below:

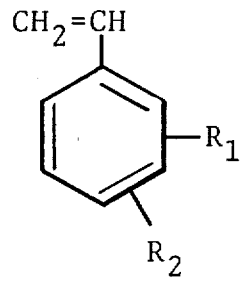

Column 5, line 41, "When the monomers" should read -- When monomers --. Column 8, line 47, "where said" should read -- wherein said --. Column 10, line 25, "trialykyl" should read -- trialkyl --.

Signed and sealed this 17th day of November 1970.

(SEAL)
Attest:

EDWARD M. FLETCHER, JR.                         WILLIAM E. SCHUYLER, JR.
Attesting Officer                                    Commissioner of Patents